Feb. 26, 1963    H. SCHOENMAKERS ET AL    3,078,694
METHOD OF FLAME SEALING OF GLASS TUBE
Filed July 5, 1956    2 Sheets-Sheet 1
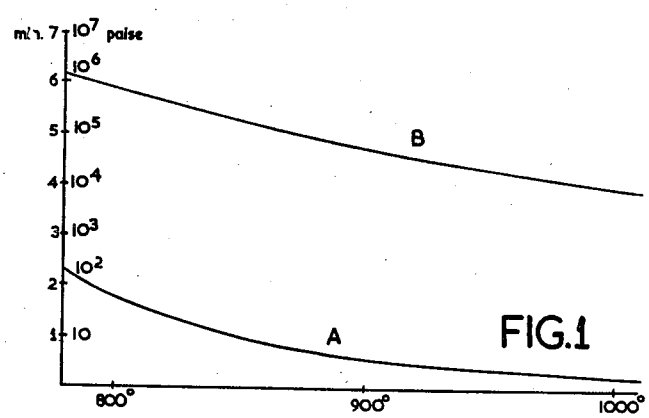
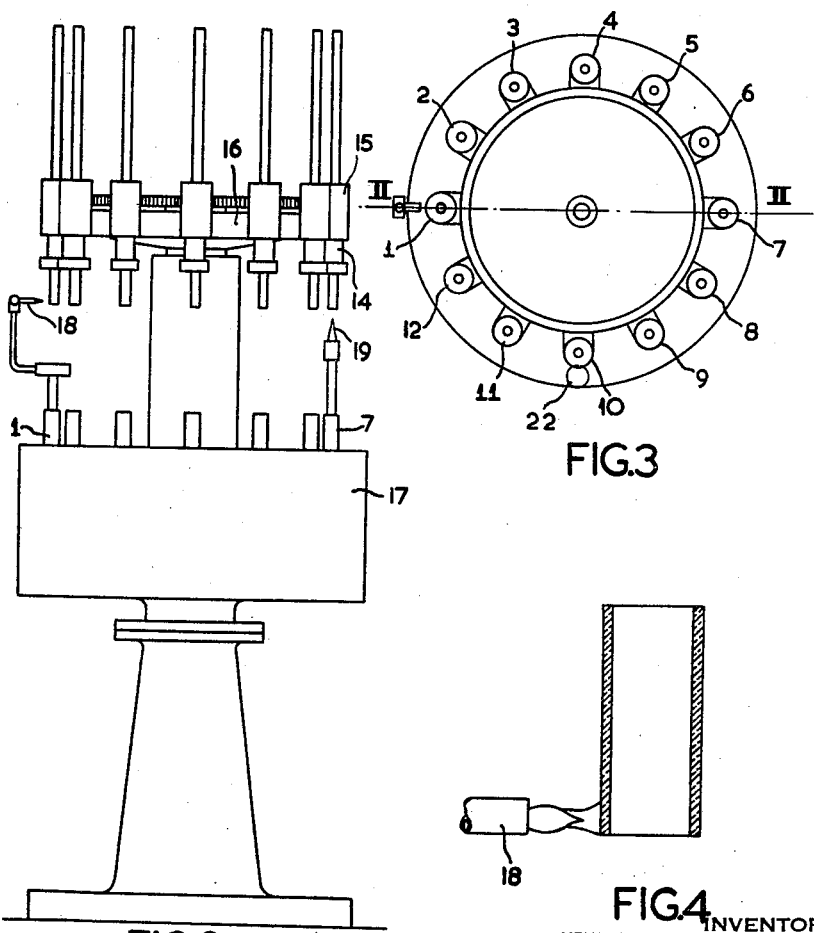
INVENTORS
HENDRIKUS SCHOENMAKERS
ANTON MAARTEN KRUITHOF
ALFONSUS JOHANNES PETRUS ANSEMS
BY
AGENT Feb. 26, 1963 H. SCHOENMAKERS ET AL 3,078,694
METHOD OF FLAME SEALING OF GLASS TUBE
Filed July 5, 1956 2 Sheets-Sheet 2
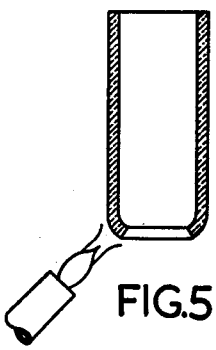
FIG.5
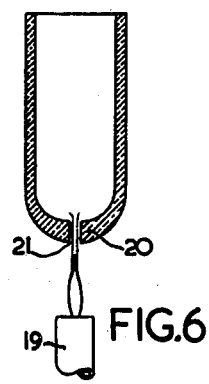
FIG.6
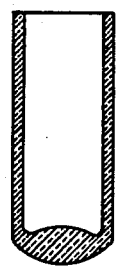
FIG.7
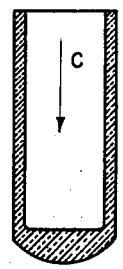
FIG.8
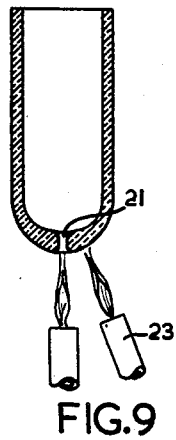
FIG.9
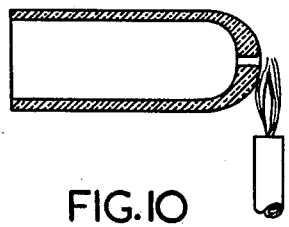
FIG.10
INVENTORS
HENDRIKUS SCHOENMAKERS
ANTON MAARTEN KRUITHOF
ALFONSUS JOHANNES PETRUS ANSEMS
BY 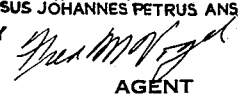
AGENT 3,078,694
METHOD OF FLAME SEALING OF GLASS TUBE
Hendrikus Schoenmakers, Anton Maarten Kruithof, and Alfonsus Johannes Petrus Ansems, Eindhoven, Netherlands, assignors, by mesne assignments, to North American Philips Company, Inc., New York, N.Y., a corporation of Delaware
Filed July 5, 1956, Ser. No. 595,931
Claims priority, application Netherlands July 6, 1955
3 Claims. (Cl. 65—109)

This invention relates to methods of manufacturing hollow glass objects each closed at one extremity. Such hollow objects may be used for several purposes, for example as packing glass, as an initial material for the manufacture of bulbs for glowlamps, or as glowlamp bulbs themselves. It is common practice to manufacture such hollow objects by utilizing tube glass and, after heating, drawing off a portion from it so as to obtain an extremity which has more or less the shape of a funnel. Subsequently, the extremity of the tube is sealed to as to form a base. This method may involve loss of glass and this is naturally undesirable.

The object of the invention is to avoid this loss of glass by sealing the extremity of the tube, without it being deformed by drawing off a portion of the glass, so as to form a base.

According to the invention, a glass tube, which is open at each end, is deformed at one extremity, so that only a narrow channel remains open, this extremity subsequently being heated by a flame and at least a portion of the combustion gases being led through the narrow channel, the glass bounding the channel thus being heated so high and so long that, due to the surface tension of the glass, the channel is fully closed and a perfect seal is obtained. The term "narrow channel" is to be understood in this case to mean a channel having a diameter smaller than 1 mm.

It has been found that in this method the heating process must be such that, after the channel has been locally closed due to the fusion of the glass, the surface tension overcomes the viscosity of the glass, so that the whole of the channel closes due to contraction and a homogeneous seal is obtained. It is important that precisely the glass bounding the channel should be intensely heated. This method permits of obtaining a perfect seal, that is a seal in which no remainders of seams are present. The temperature of the flame must be comparatively high, for example, from 1200° to 1500° C. It is also desirable for the flame to be of a composition such that the quality of the glass is not detrimentally affected. Thus, in certain cases, for example for lead glass, it is desirable to utilize a distinctly oxidizing flame and, furthermore, the temperature of the flame must usually not be excessive in order to avoid unwanted gasblisters in the melt. It is important that at least a portion of the combustion gases flows through the narrow channel, so that the interior of the channel is heated. In order to allow escapement of the gases, use is made of a tube which is open at each end. If the tube is not positioned horizontally, a chimney effect occurs in the tube, thus facilitating the drawing-in of the gases into the tube. It is naturally also possible to provide the tube with means for drawing the gases through the tube.

Deforming one extremity of a glass tube, so that only a narrow channel remains, may be effected, for example, with the use of mechanical means, such as by rolling in. In one embodiment of the invention, one extremity of a glass tube may be deformed by heating this extremity so as to form the narrow channel due to contraction of the glass.

In another embodiment of the invention, the extremity of the tube is sealed so as to obtain a lens. The duration of the heating process influences the amount of molten glass, which, if the viscosity is sufficiently low, has a tendency to assume a spherical shape due to the surface tension. It has surprisingly been found that such a base may be used as a lens.

It is to be noted that lenses could alternatively be manufactured by drawing off a portion of a tube and sealing up the closed extremity. However, this method is not particularly suitable for continuous operation and may also result in a loss of glass.

The closed extremity of the tube, after being formed by the methods above described and before being separated from the tube, may be subjected to after-shaping. This after-shaping preferably takes place immediately after the extremity has been closed, for example, by bringing about a difference in pressure between the lower side and the upper side of the seal, for example by means of either an overpressure or a subpressure in the tube, or an overpressure externally of the seal, so that the base is displaced to a greater or lesser extent with respect to the wall. It is thus also possible to manufacture bulbs. Furthermore, it is possible in known manner to change the shape of the base by means of mechanical expedients, such as a matrix.

After one extremity has been closed in the manner above described, the closed portion may be separated from the tube, whereafter the new end of the tube may be sealed for manufacturing a subsequent object.

It has been found that the quality of the edge of the tube must satisfy high requirements. Consequently, it is desirable that the end, before a duct has been obtained, is deformed in such manner that unwanted impurities in the molten glass are avoided. If, for example, in order to initiate a breakage, the tube is scratched by means of a scratching apparatus manufactured of carbides as known under the trademark "Widia" or "Carborundum," is has been found with the end thus obtained that unwanted impurities may occur in the melt. It has also been found that in certain cases a rough edge alone may also be undesirable. Consequently the tube portion is preferably heated and tipped off by means of local cooling, whereby contamination of the glass does not occur.

The methods above described are suitable not only for hand work, but also for machine work. In the latter case it is usually desirable for structural reasons that the glass tube should be arranged vertically, while during the sealing of the narrow channel the flame is directed substantially in the direction of the axis of the tube.

It may also be desirable, more particularly if a large glass mass is to be sealed such as, for example, in the manufacture of lenses, that the extremity of the tube should be heated not only by the flame of which at least a portion of the combustion gasses flows through the narrow channel, but also by one or more flames which substantially heat the surroundings of the aperture of this channel.

If the method is automatic, the glass tube can usually be led through several processing stages either continuously or intermittently. For structural reasons it is in this case desirable for the tube to be heated by one or more flames which are initially arranged at right angles to the axis of the tube and which, as the heating proceeds, are directed more and more upwards at sequential stages.

The device which permits of carrying out the methods above described is characterized in that it comprises means for clamping the tube glass in position, means for moving the tube glass into sequential processing stages, one or more burners for heating one extremity of the tube glass, and means for rotating the tube glass with respect to the burner, at sequential processing stages at least one burner being directed more and more in the direction of the axis of the tube and one stage being present, at which at least one burner is directed substantially in the direction of the axis of the tube. In this construction either the tube can rotate, or a burner can rotate about the tube. In the former case, the base may be given different shapes as a function of the rotational speed. At low speeds, the largest amount of glass is at at the centre and at high speeds a substantially plane base may be obtained, whereas at very high speeds the largest amount of glass is present on the edge.

In order that the invention may be readily carried into effect, it will now be described, by way of example, with reference to the accompanying drawings.

FIG. 1 shows a graph illustrating, for a predetermined case and a predetermined kind of glass, the relationship between that viscosity, at which the surface tension overcomes the viscosity, the temperature and the heating time.

FIGS. 2 and 3 show a sideview and a plan view, respectively, of a device for use of the invention, FIG. 2 showing only those burners which are present on the line II—II of FIG. 3.

FIGS. 4, 5 and 6 show the processing conditions of a glass tube at different stages on this machine.

FIGS. 7 and 8 show several examples of the products manufactured by the method according to the invention.

FIG. 9 shows a glass tube in which an additional burner is present during sealing, while in FIG. 10 a glass tube is closed by sealing in the horizontal position.

In order to obtain an impression of the dependency of the heating time and the temperature, at which the viscosity overcomes the surface tension, a test was made with a plurality of glass plates of the following composition:

| | Percent |
|---|---|
| $SiO_2$ | 67.5 |
| $Na_2O$ | 17.7 |
| $K_2O$ | 1.0 |
| $CaO$ | 5.4 |
| $MgO$ | 3.9 |
| $Al_2O_3$ | 2.5 |

The glass plates were coarsely frosted on each side and laid on an asbestos underlayer, followed by heating in an oven. During heating, the time needed by the frosted surface to be smoothed by the surface tension of the glass was measured at a given temperature. The result is indicated by line A in FIG. 1. In this figure, the temperature is indicated in ° C. on the horizontal axis and the heating time is indicated in minutes on the vertical axis. Furthermore, line B in this figure indicates the viscosity of the glass with respect to the temperature. For this purpose, the viscosity is also plotted in poise on the vertical axis.

The test reveals that at low temperatures it takes up much time before the viscosity overcomes the surface tension.

When the tube is sealed in the manner above described, it is important for the heating time to be as short as possible. It is thus achieved that substantially that glass which bounds the narrow channel becomes fluid, so that the base does not become unduly thick. The temperature of the flame must preferably be, for example, from 1200° to 1500° C. as a function of the kind of the glass, the temperature of the glass then naturally being considerably lower.

In the device shown in FIGS. 2 and 3, a plurality of glass tubes arranged vertically are processed simultaneously, as is common practice in many cases. The machine has 12 processing stages indicated by 1 to 12. The glass tubes are open at each end and clamped in position in the usual manner by means of clamping heads 14, while being rotatable in known manner about their vertical axes in holders 15. For this purpose, use may be made of a conventional drive (not shown). The holders 15 for the tubes are secured to an upper frame 16, which can be rotated in the usual manner with respect to a table 17, so that each glass tube may be moved into a subsequent processing stage. The table carries a plurality of burners for heating the glass tubes.

FIG. 2 shows two such burners, 18 and 19 respectively. Burner 18, which is associated with stage 1, is the first burner to heat the lower end of the glass tube. At this stage, the burner is positioned horizontally. The same applies to the burner present at stage 2. FIG. 4 again shows the position of these burners.

At stages 3, 4, 5 and 6, the burners are directed more and more upwards, as may be seen, for example, from FIG. 5, in which the position of the burner at stage 5 is shown.

At stage 7, the burner 19 is positioned vertically, as also shown in FIGURES 2 and 6. Due to the preceding heating, the edge of the tube has been more and more deformed so as to form a thickened portion 20 of fluid glass as shown in FIG. 6, which has a narrow channel 21 at its centre. The combustion gases of the burner 19 flow at least in part through this channel, thus intensely heating the exterior and more particularly the interior thereof, so that the extremity of the tube locally fuses together, resulting in the glass closing the channel completely under the action of its surface tension. The product thus obtained is shown in FIG. 7.

It has been found that the resultant seal of the tube may be of sufficiently high quality to serve as a lens. However, it will be evident that the manufactured object may also be used very well as an initial material for products of quite different shape, for example for bulbs. It is also possible to vary the shape of the seal, for example, by admitting a subpressure or a surpressure to the tube (as indicated by arrow C in FIG. 8), resulting in, for example, a shape as shown in FIG. 8 being obtained.

After the tube has been closed by the above-described methods, it may be slowly cooled in the usual manner and for this purpose burners (not shown) are provided at stages 8, 9 and 10, whereupon the tube may be heated at some distance from its lower end and at stage 10 the lower portion may be separated from the tube by contact with a cold object 22.

After tipping off, the tube at stage 12 may be pushed further downwards by the clamping head, so that again the new extremity of the tube may be deformed.

On the one hand, it is very important that the temperature of the flame should be comparatively high, for example from 1200° to 1500° C. at the time when the combustion gases flow through the narrow channel 21. On the other hand, however, it is also desirable that the flame should not detrimentally affect the quality of the glass, so that an unduly high temperature of the glass must be avoided in order to prevent gas occlusion in the melt. The temperature is naturally dependent upon the kind of the glass. In certain cases it is also necessary to utilize an oxidizing flame, for example, if the tube is manufactured from glass containing lead.

In certain cases, in sealing the tube, it may be desirable to heat the surroundings of the narrow channel. For this purpose a burner 23 is present as shown in FIG. 9. This method can advantageously be used, more particularly if the seal must have a great thickness and for example, a very thick lens must be formed. In the arrangement shown in FIG. 10, the tube is positioned horizontally and in order to make the combustion gases in this case flow through the narrow aperture 21, it is frequently desirable for the gases to be drawn through the tube.

In the machine shown, the movement of the holders 15 is intermittent. It is naturally also possible that the holders rotate continuously. Furthermore, it is possible to supply the machine with a large number of small tubes instead of long tubes, each tube then already having the desired length.

FIG. 8 shows a tube, in which a slight overpressure has prevailed, so that the base has been pushed a small distance outwardly.

What is claimed is:

1. A method of sealing one end of a glass tube initially open on both ends to form a lens-shaped closure at one end comprising flame heating one end of said glass tube by means of at least one burner positioned initially substantially at right angles to the longitudinal axis of said glass tube, moving said one burner successively to selected positions at lesser angles to said longitudinal axis of the glass tube to gradually reduce the size of the opening in said one end of the glass tube, and further flame heating said one end of the glass tube with the burner in a substantially vertical position whereby at least a portion of the combustion gases escape through the small opening in said one end of the glass tube to heat the adjacent glass areas at such a temperature and for such a duration that said opening is closed as a result of the surface tension of the glass.

2. A method of sealing one end of a glass tube initially open on both ends to form a lens-shaped closure at said one end comprising flame heating one end of said glass tube by means of at least one burner positioned initially substantially at right angles to the longitudinal axis of said glass tube, moving said one burner successively to selected positions at lesser angles to said longitudinal axis of the glass tube to gradually reduce the size of the opening in said one end of the glass tube, and further flame heating said one end of the glass tube with the burner in a substantially vertical position whereby at least a portion of the combustion gases escape through the small opening in said one end of the glass tube to heat the adjacent glass areas at such a temperature and for such a duration that said opening is closed as a result of the surface tension of the glass, and shaping said one end of the glass tube after said opening has been closed.

3. A method of sealing one end of a glass tube initially open on both ends to form a lens-shaped closure at said one end comprising flame heating one end of said glass tube by means of at least one burner positioned initially substantially at right angles to the longitudinal axis of said glass tube, moving said one burner successively to selected positions at lesser angles to said longitudinal axis of the glass tube to gradually reduce the size of the opening in said one end of the glass tube, and further flame heating said one end of the glass tube with the burner in a substantially vertical position whereby at least a portion of the combustion gases escape through the small opening in said one end of the glass tube to heat the adjacent glass areas at such a temperature and for such a duration that said opening is closed as a result of the surface tension of the glass, and placing another flame substantially adjacent to said small opening during the preceding step whereby said other flame and combustion gases heat the adjacent glass areas.

References Cited in the file of this patent
UNITED STATES PATENTS

| | | |
|---|---|---|
| 1,967,603 | Zimber | July 24, 1934 |
| 2,159,736 | Geiger et al. | May 23, 1939 |
| 2,168,509 | Bennett | Aug. 8, 1939 |
| 2,300,917 | Gaskill | Nov. 3, 1942 |
| 2,392,104 | Smith | Jan. 1, 1946 |
| 2,469,681 | Coby | May 10, 1949 |
| 2,491,762 | Piszel | Dec. 20, 1949 |